(12) United States Patent
Roberts (10) Patent No.: US 9,413,606 B1
(45) Date of Patent: Aug. 9, 2016

(54) AUTOMATION OF NETWORKED DEVICES (71) Applicant: Dropbox, Inc., San Francisco, CA (US)

(72) Inventor: Paul Roberts, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/528,934

(22) Filed: Oct. 30, 2014

Related U.S. Application Data (60) Provisional application No. 61/989,907, filed on May 7, 2014.

(51) Int. Cl.
*H04L 29/06* (2006.01)
*H04L 12/24* (2006.01)
*H04L 29/08* (2006.01)
*H04L 9/08* (2006.01)

(52) U.S. Cl.
CPC .......... *H04L 41/0816* (2013.01); *H04L 9/0872* (2013.01); *H04L 63/0492* (2013.01); *H04L 63/08* (2013.01); *H04L 67/18* (2013.01)

(58) Field of Classification Search
CPC .......................... H04L 63/0492; H04L 9/0872
See application file for complete search history.

(56) References Cited

U.S. PATENT DOCUMENTS

| | | | |
|---|---|---|---|
| 7,379,778 B2 | 5/2008 | Hayes et al. | |
| 8,539,567 B1 | 9/2013 | Logue et al. | |
| 2006/0165040 A1* | 7/2006 | Rathod | G06Q 10/10 370/335 |
| 2008/0200143 A1* | 8/2008 | Qiu | H04M 1/2535 455/404.2 |
| 2012/0069131 A1* | 3/2012 | Abelow | G06Q 10/067 348/14.01 |
| 2012/0264427 A1* | 10/2012 | Adatia | H04W 4/14 455/435.1 |
| 2014/0244001 A1* | 8/2014 | Glickfield | H04L 67/16 700/33 |
| 2015/0006695 A1* | 1/2015 | Gupta | H04L 41/32 709/223 |
| 2015/0237071 A1* | 8/2015 | Maher | H04L 63/20 726/1 |
| 2015/0312041 A1* | 10/2015 | Choi | H04L 9/3231 713/175 |

FOREIGN PATENT DOCUMENTS

WO    WO 2011/143273 A1    11/2011

OTHER PUBLICATIONS

Roman, Rodrigo, Jianying Zhou, and Javier Lopez. "On the features and challenges of security and privacy in distributed internet of things." Computer Networks 57.10 (2013): 2266-2279.*

(Continued)

*Primary Examiner* — Shawnchoy Rahman
(74) *Attorney, Agent, or Firm* — Fenwick & West LLP

(57) ABSTRACT

A networked device management system is in direct communication with a user's networked devices. Alternatively, the networked device management system is in communication with the networked devices via a controller located in proximity to the networked devices. A networked device is an addressable device that is capable of communicating with networked device management system. The networked device management system allows users to control the state of the user's networked devices that are registered with the networked device management system. That is, the networked device management system affords user control over the functional capabilities of the user's networked device. Networked devices of a user may be located in different geographical locations yet are still user controllable via the networked device management system. Thus, a user does not need to be in the proximity of the networked device in order to control the functional capabilities of the networked device.

17 Claims, 8 Drawing Sheets

(56) References Cited

OTHER PUBLICATIONS

Cooper, J. et al., "Challenges for Database Management in the Internet of Things," IETE Technical Review, 2009, pp. 320-329, vol. 26, No. 5.

Haller, S. et al., "The Internet of Things in an Enterprise Context," Future Internet—FIS 2008, Springer Berlin Heidelberg, 2009, pp. 14-28.

Higginbotham, S., "Are We Nearing the Dropbox Moment for the Internet of Things?" Apr. 22, 2014, 5 pages, [Online] [Retrieved on Jun. 25, 2015] Retrieved from the Internet<URL: https://gigaom.com/2014/04/22/are-we-nearing-the-dropbox-moment-for-the-internet-of-things/>.

Jeffery, K.J., "The Internet of Things: The Death of a Traditional Database?" IETE Technical Review, 2009, pp. 313-319, vol. 26, Issue 5.

Panta, R.K., "Remote Reprogramming of Wireless Sensor Networks," PhD Thesis, Purdue University, May 2010, 214 pages. May be Retrieved at URL<https://www.cerias.purdue.edu/assets/pdf/bibtex_archive/bibtex_archive/2010-18-report.pdf>.

"Share Your Thing—Like It Ain't No Thang," dweet.io, Bug Labs, Inc., 2015, 7 pages, [Online] [Retrieved on Jun. 25, 2015] Retrieved from the Internet<URL: http://dweet.io/>.

* cited by examiner

AUTOMATION OF NETWORKED DEVICES

CROSS-REFERENCE TO RELATED APPLICATIONS

This application claims the benefit of U.S. Patent Application No. 61/989,907, filed on May 7, 2014, which is incorporated by reference in its entirety.

BACKGROUND

1. Field

Described embodiments pertain in general to automation of networked devices.

2. Description of the Related Art

A person's home may include many devices. Conventional home automation techniques allow a user to configure the devices such that they may intercommunicate with one another to create a unified automated home. However, conventional home automation techniques require the usage of proprietary technology and protocols to establish the unified automated home that allows the devices to communicate with one another. Furthermore, conventional home automation techniques only allow user control of devices colocated within the user's home, but do not allow user control of devices located outside of the user's home.

BRIEF SUMMARY

A networked device management system allows user control of registered networked devices. A networked device is an addressable device that is capable of communicating with networked device management system. For example, the networked device management system affords user control over the functional capabilities of the user's networked device via the networked management system. Thus, a user does not need to be in the proximity of the networked device in order to control the functional capabilities of the networked device. For example, the user may be located at his or her office, but may turn on or off a networked device such as a light switch in the user's home.

The networked devices do not need to be colocated in a same geographical location to be controlled via the networked device management system. For example, a networked device may be located at the user's office and another at the user's home. Although the two networked devices have different locations, the user may still control the functional capabilities of the different networked devices via the networked device management system.

In one embodiment, the networked device management system publishes settings of functional capabilities of networked devices registered with the system. A user may view the published settings for a networked device of another user and request for the networked device management system to replicate the published settings onto the user's networked device. The networked device management system receives the request and instructs the user's networked device to modify its settings according to the published settings of the other user.

Features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
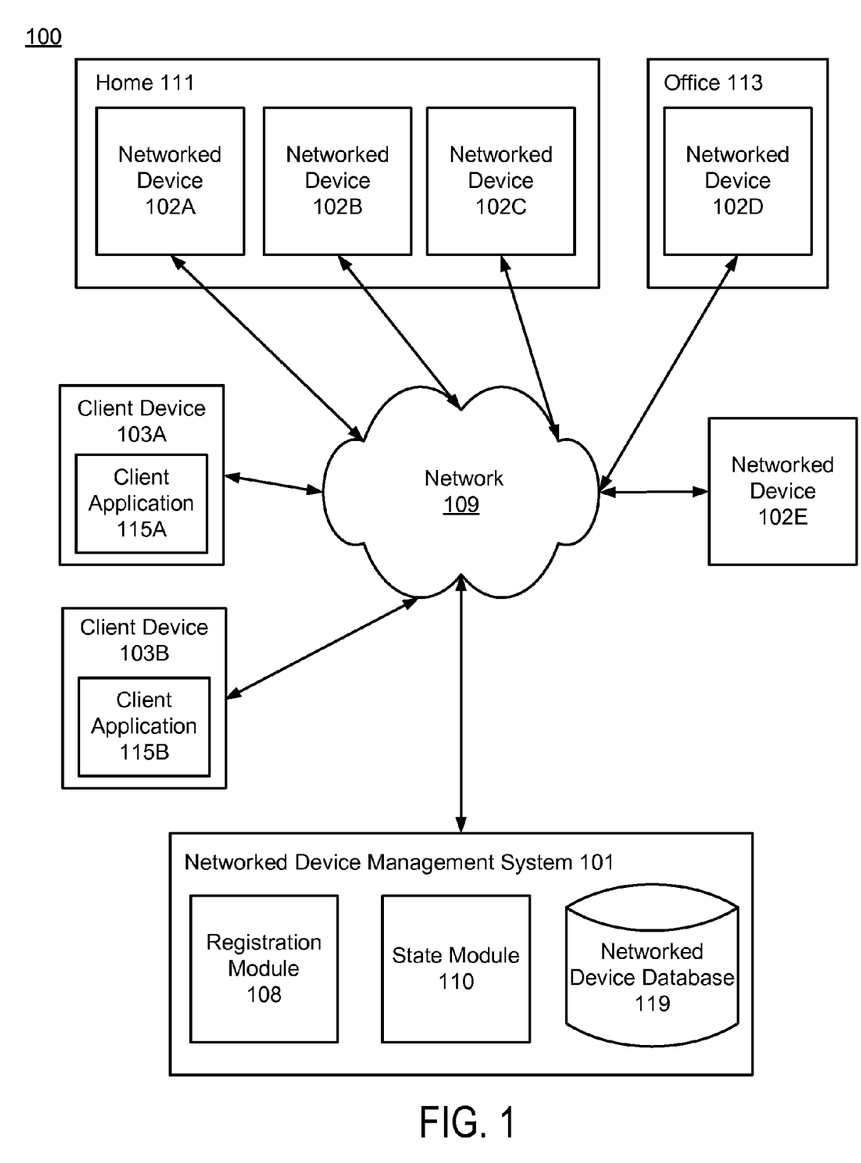
FIG. 1 is a block diagram of a networked device management system environment according to one embodiment.

FIG. 1 is a block diagram of networked device management system environment 100 according to one embodiment. Environment 100 includes networked devices 102 and client devices 103. In one embodiment, networked devices 102A, 102B, 102C, and 102D and client device 103A are devices of a first user and networked devices 102E and client device 103B are devices of a second user. Networked devices 102 and client devices 103 are connected to networked device management system 101 via network 109. Although illustrated environment 100 only includes five networked devices 102 and two client devices 103, other embodiments include additional networked devices and client devices (e.g., thousands of networked devices and client devices).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multi-protocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Each networked device 102 is an addressable device that is capable of communicating with networked device management system 101 via network 109 and performs an action in response to receiving instructions from networked device management system 101. In particular, each networked device 102 is individually capable of receiving instructions sent by networked device management system 101 and updating its state based on the instructions. In one embodiment, the state of a networked device 102 describes whether networked device 102 is on or off or state may describe the current settings of one or more functional capabilities of networked device 102. For example, networked device 102A may be a light switch configured to toggle between an on state and an off state in response to instructions from NDMS 101. Other examples of networked devices 102 include home appliances (e.g., refrigerator, coffee maker, toaster, freezer, oven, and microwave), an electronic thermostat, a sprinkler system, an automobile, a pool heater, a hot tub, a personal computer, a television, a television set-top box, a mobile phone, a tablet, and a personal digital assistant (PDA).

In one embodiment, the user of networked devices 102 does not need to be in proximity to networked devices 102 to control the state of networked devices 102 since the user controls networked device 102 via NDMS 101. Furthermore, networked devices 102 of a user may be located at different geographic locations. Thus, networked devices 102 do not need to be colocated at a single geographical location. For example, networked devices 102A, 102B, and 102C may represent the first user's home appliances located at the first user's home 111, whereas networked device 102D is an electronic thermostat located at the first user's office 113. The first user may be located at a geographical location other than home 111 and office 113, but can still control the state of networked devices 102A, 102B, 102C, and 102D.

In one embodiment, each client device 103 is a computer system capable of communicating with NDMS 101 via network 109. Examples of client device 103 include a personal computer, a mobile phone, a tablet, a personal digital assistant (PDA), or a laptop. As shown in FIG. 1, client device 103 includes client application 115. Client application 115 is a computer program stored on client device 103 that allows the user to control operation of the user's networked devices 102 via NDMS 101.

Client application 115 includes a user interface that displays a list of the user's networked devices 102. Upon user selection of a networked device 102 from the list, client application 115 displays various functional capabilities of networked device 102 and the current state of each functional capability. For example, if networked device 102A is a light switch in home 111 of the first user, client application 115 may display an on/off capability and an indication of whether the light switch is currently on or off. In another example, networked device 102E is a refrigerator in the first user's office 113. Accordingly, client application 115 may display capabilities of the refrigerator such as refrigerator temperature control, freezer temperature control, and ice type making capability along with the current state of each capability such as 35° F., 0° F., and cubed ice, respectively. Furthermore, client application 115 allows the user to establish permission settings for the user's networked devices 102 as further described below.

Networked device management system (NDMS) 101 is a computer system that controls networked devices 102. NDMS 101 functions as a configuration and control channel for networked devices 102. NDMS 101 uses an application programming interface (API) of system 101 to communicate with networked devices 102.

As shown in FIG. 1, NDMS 101 includes registration module 108, state module 110, and networked device database 119. As is known in the art, the term "module" refers to computer program logic utilized to provide the specified functionality upon execution by NDMS 101. Other embodiments of NDMS 101 can have different and/or other modules than the ones described here, and that the functionalities can be distributed among the modules in a different manner.

Registration module 108 registers networked devices 102 with NDMS 101. Registration of networked devices 102 with NDMS 101 allows user(s) to control the state of networked devices 102 via NDMS 101. Registration module 108 registers networked device 102 in response to a user request from client device 103. The user requesting to register networked device 102 may be the owner of networked device 102.

In one embodiment, registration module 108 receives a request from client device 103 for a registration token to register networked device 102 with NDMS 101. In response to the request from client device 103, registration module 108 generates a registration token. In one embodiment, the registration token is a one-time credential used by networked device 102 being registered to connect to NDMS 101. The registration token may only be used once and is valid for a limited period of time (e.g., 10 minutes) before the registration token expires. Alternatively, the registration token is valid until submitted b networked device 102 for registration.

Registration module 108 sends the registration token to client device 103 that submitted the request to register networked device 102. Client device 103 forwards the registration token received from registration module 108 to networked device 102. Registration module 108 then receives a registration request from networked device 102 that includes the registration token generated by the registration module 108. The registration request may also include metadata associated with networked device 102 as further described below.

Registration module 108 compares the registration token received from networked device 102 with valid registration tokens. In one embodiment, a registration token is valid if it has not expired and has been used only once in a registration request received from networked devices 102. That is, if a registration token is submitted to registration module 108 multiple times, it is invalid.

Registration module 108 determines the validity of the registration request based on whether the registration token received from networked device 102 is valid. If registration module 108 determines the registration token is invalid, registration module 108 denies the registration request sent by networked device 102. If registration module 108 determines the registration token is valid, registration module 108 marks the registration token as no longer being valid and registers networked device 102 using the metadata included in the registration request.

In one embodiment, the metadata included in the registration request sent by networked device 102 describes the device's capabilities. The metadata included in the registration request is dependent on the device type of networked device 102. For example, metadata for a light switch is different than metadata for a refrigerator. The light switch may only include capabilities of being in an on state or an off state. In contrast, a refrigerator may have capabilities including refrigerator temperature control, freezer temperature control, ice type (e.g., cube or crushed), different energy modes (e.g., power saving mode or performance mode), door lock settings, etc. The metadata included in the registration request from networked device 102 may also include current setting information for each of the device capabilities of networked device 102. The metadata may also include device information such as a device model number and a serial number that is unique to networked device 102.

Registration module 108 registers networked devices 102 in networked device database 119. Networked device database 119 stores information about networked devices 102 including metadata included in the registration requests from networked devices 102. In one embodiment, networked device database 118 stores the information in a set of tables where each table is a collection of records. The set of tables stored in networked device database 119 include a metadata table comprising metadata of networked devices 102 that are registered with NDMS 101. The metadata table describes the functional capabilities of networked devices 102 registered with NDMS 101.

The metadata table includes a plurality of metadata records where each metadata record is associated with a particular networked device 102. A metadata record for networked device 102 includes a set of fields, each with a name. The fields include capability fields. Each capability field has a name indicative of a functional capability of networked device 102. For example, a metadata record for a refrigerator may include capability fields of refrigerator temperature, freezer temperature, ice type, and energy mode. The metadata record for networked device 102 may also include a serial number field indicating the serial number of the networked device 102. In one embodiment, the metadata for networked device 102 can be modified by a user via client application 115 on client device 103.

Networked device database 119 may also include a state table that describes the current state of each networked device 102. The state table includes a collection of state records that are each associated with a particular networked device 102. A state record for networked device 102 is joined with the metadata record for the networked device 102 and includes a plurality of state fields indicating values that represent the current setting of each functional capability for networked device 102 specified in the metadata record for networked device 102. Continuing the refrigerator example above, the state fields may indicate values describing the user's refrigerator temperature setting (e.g., 33° F.), freezer temperature setting (e.g., 0° F.), ice type setting (e.g., cubed), and energy mode setting (e.g., power saving).

Networked device database 119 may also include a permission table. The permission table describes permission settings associated with each networked device 102. The permission table includes a collection of permission records that are each associated with a particular networked device 102. A permission record for networked device 102 is joined with the metadata record and state record for networked device 102 and includes a plurality of state fields indicating permission settings of each capability for networked device 102.

In one embodiment, permission settings for controlling the functional capabilities of networked device 102 are user based and are established by an owner of networked device 102. The permission settings for networked device 102 include a primary user associated with networked device 102 and one or more additional users that are granted permission to control networked device 102.

The permission settings for networked device 102 include for each user a level of device control afforded to the user. The level of control may include full control of all the functional capabilities of networked device 102 indicated in the metadata table. The level of control may also be limited such that only a subset of the functional capabilities indicated in the metadata are available to the user.

For example, the permissions setting for networked device 102A may grant the first user associated with client device 103A full control of all the functional capabilities of networked device 102A given that the first user is the owner of networked device 102A. The permissions setting for networked device 102A may also grant the second user associated with client device 103B limited control of the functional capabilities of networked device 102A. Continuing the refrigerator example, the second user may only be allowed to control the ice type setting of the refrigerator via client device 103B based on the permission settings for networked device 102A.

In one embodiment, permission settings for networked device 102 are dependent on the device type of client device 103 that is requesting control of networked device 102. Particular types of client devices may be deemed more secure than other types of client devices and thus afforded more control compared to types of devices that are deemed less secure. For example, in one embodiment client devices 103 that connect to the NDMS 101 via a LAN are granted a higher level of security than other client devices 103 that connect to NDMS 101 via the Internet. Thus, the client devices 103 connected to the NDMS 101 via a LAN may be granted full access to the functional capabilities of networked device 102 whereas client devices 103 connected to NDMS 101 via the Internet may be granted limited access to the functional capabilities of networked device 102.

In one embodiment, permission settings for networked devices 102 are dependent on the current geographic location of client device 103 that is requesting control of networked devices 102. The geographic location of client device 103 may be determined based on the IP address of client device 103. Alternatively, NDMS 101 may query client device 103 for its current geographic location. Particular geographic locations of client devices 103 may be deemed more secure than other geographic locations and thus client devices 103 located at more secure locations are afforded more control. For example, client device 103A may be afforded more control of networked device 102A, 102B, and 102C if client device 103A is located at home 111 versus at office 113 because the user's home 111 has a higher level of security than the user's office 113.

State module 110 sends instructions via network 109 to networked devices 102 to change the state of one or more functional capabilities. State module 110 receives a request from client device 103 to change the state of networked device 102. The request includes an indication of the particular networked device 102 associated with the request and a desired state of a functional capability of networked device 102. For example, state module 110 may receive a request from client device 103A to change the refrigerator temperature (i.e., the functional capability) of networked device 102B from 33° F. to 30° F.

Responsive to receiving the request from client device 103 to change the state of networked device 102, state module 110 accesses networked device database 119 to identify the state record associated with networked device 102 indicated in the request. State module 110 identifies within the state record the state field associated with the functional capability of the networked device 102 requesting to be changed. State module 110 changes the value of the state field according to the request. By changing the value of the state field, state module 110 logs the updated state of the functional capability of networked device 102. Continuing the refrigerator temperature example, state module 110 identifies the state record associated with networked device 102B and changes the value of the refrigerator temperature state field from 33° F. to 30° F.

Once the state of the functional capability of networked device 102 is updated in networked device database 119, state module 110 sends an instruction to networked device 102 to update its state according to the desired state specified in the request. For example, the state module 110 may send an instruction to networked device 102B to change its refrigerator temperature from 33° F. to 30° F. In one embodiment, networked device 102 sends a confirmation to NDMS 101 confirming whether the state of the functional capability has been changed.

In one embodiment, state module 110 determines whether client device 103 submitting the request to change the state of networked device 102 is granted permission to alter the state of networked device 102. State module 110 makes the determination prior to changing the state of the networked device in networked device database 119. State module 110 may access the permission settings of networked device 102 from networked device database 119 responsive to receiving the request and determines a level of control afforded to client device 103. The level of control is determined by state module 110 by comparing the permission settings with the context of the request from client device 103. In one embodiment, the context of the request describes information about the client device 103 that submitted the request such as a name of the user using client device 103, a geographic location of client device 103, and/or a device type of client device 103. The comparison indicates the level of control granted to client device 103 based on the permission settings for networked device 102.

State module 101 receives notifications from networked devices 102 indicative of state changes made by users at networked devices 102. If a user updates the state of networked device 102 at networked device 102, networked device 102 sends a notification to state module 101 that indicates the state change. In one embodiment, the notification indicates the functional capability altered by the user and the setting for the functional capability. Consider the example where networked device 102A is a light switch. If the user changed the state of the light switch from off to on, networked device 102A sends a notification to state module 101 indicating the change from the off state to the on state. Responsive to receiving the notification, state module 101 accesses networked device database 119 to update the state record for networked device 102 to reflect the state change at networked device 102.

In one embodiment, NDMS 101 publishes settings information of networked devices 102 specified in networked device database 119 via a website. The settings information of networked devices 102 are the current state information of networked devices 102 in networked device database 119. The current state information may only be published if permission is granted by owners of networked devices 102. Owners of networked devices 102 may allow NDMS 101 to publish the current state information of networked devices 102 to allow others that own the same networked devices 102 to replicate the settings onto their networked devices 102 via NDMS 101. For example, a user of NDMS 101 may purchase the same light switch as another user and may request that NDMS 101 replicate the published state information of the other user's light switch onto the light switch purchased by the user.

NDMS 101 may include in the website a list of different types of networked devices 102 such as light switches, refrigerators, sprinkler systems, televisions, etc. Each included type of networked device includes a model list of particular supported models of that device type. Each model includes one or more different setting configurations shared by other users of NDMS 101.

State module 110 receives a request from client device 103 to view published device settings of networked device 102 of interest. State module 110 sends the settings of those networked device 102 to client device 103 for display on client application 115 responsive to the request. If the user wants to replicate the settings of networked device onto his or her networked device 102, state module 110 receives a replication request from client device 103. In one embodiment, the replication request includes an indication of the user's networked device 102 in which the settings will be replicated. For example, networked device 102E of the second user may be a refrigerator that is the same model as networked device 102B of the first user. The second user may view settings of networked devices 102B via client application 115B on client device 103B and may request to replicate the settings of networked device 102B onto networked device 102E.

Responsive to the replication request, state module 101 accesses networked device database 119 to identify the state record of networked device 102 specified in the replication request. State module 101 changes values of state fields of the identified networked device 102 to match the published settings indicated in the replication request. State module 101 then sends an instruction to networked device 102 to update its state.

Figure 2:
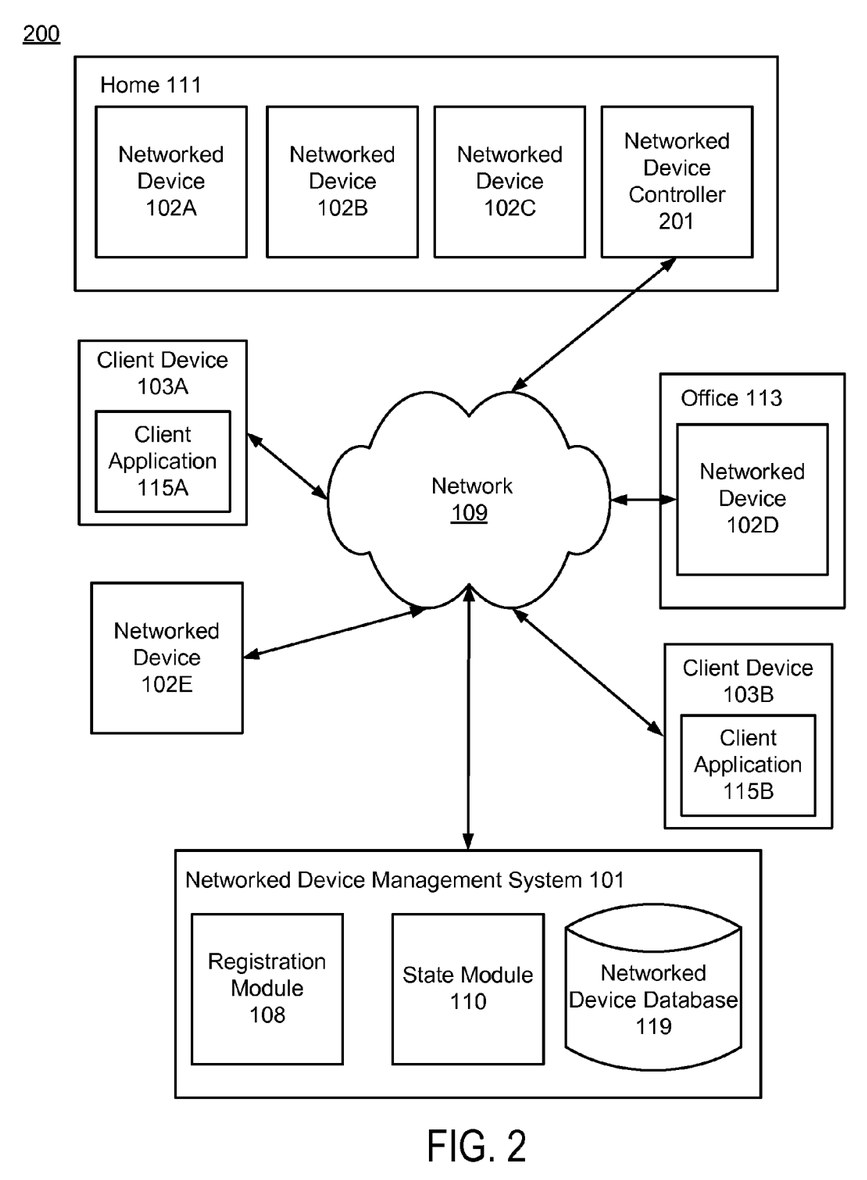
FIG. 2 is a block diagram of a networked device management system environment according to another embodiment.

Some networked devices 102 may lack the ability to communicate directly with NDMS 101. For example, some networked devices 102 may be configured to communicate with a controller using a different or proprietary protocol, or they may have insufficient programming logic to execute some of the functions described here. In various embodiments, a networked device controller acts as a bridge between these types of networked devices 102 and NDMS 101. FIG. 2 is a block diagram of networked device management system environment 200 according to an alternative embodiment. As shown in FIG. 2, home location 111 includes networked device controller 201. Networked device controller 201 is a local proxy controller within home location 111. Networked device controller 201 controls operation of networked device 102A, 102B, and 102C included in home 111 based on instructions from NDMS 101. In networked device management environment 100 shown in FIG. 1, networked devices 102 in home 111 communicate directly with NDMS 101 to receive instructions regarding state change. In contrast, in networked device management environment 200 shown in FIG. 2, networked device controller 201 communicates with NDMS 101 to receive instructions regarding state change networked devices 102 in home 111. Networked device controller 201 communicates the instructions received from NDMS 101 to networked devices 102 located at home 111 to update the state of networked devices 102 according to the instructions. Thus, NDMS 101 communicates with networked devices 102 located at the user's home 111 through networked device controller 201.

If the user changes the state of networked device 102 at networked device 102, networked device 102 sends a notification to networked device controller 201 indicative of the state change. Networked device controller 201 sends a notification to NDMS 101 indicative of the state changed at networked device 102 and NDMS 101 updates the state record for networked device 102 to reflect the state change.

Alternatively, the user may change the state of networked device 102 at networked device controller 201 which causes networked device controller 201 to send a notification to NDMS 101 that indicates the state change of networked device 102.

In one embodiment, networked device controller 201 communicates with networked devices 102 located at home 111 via a proprietary communication protocol (e.g., X10). The communication protocol used by networked devices 102A, 102B, 102C to communicate with networked device controller 201 is different than the communication protocol used by networked device controller 201 to communicate with NDMS 101. Networked device controller 201 may use the API described above to communicate with NDMS 101 to control the functional capabilities of networked devices 102. Thus, a combination of multiple communication protocols may be used to control networked devices located at the user's home 111.

Networked Device Registration

Figure 3:
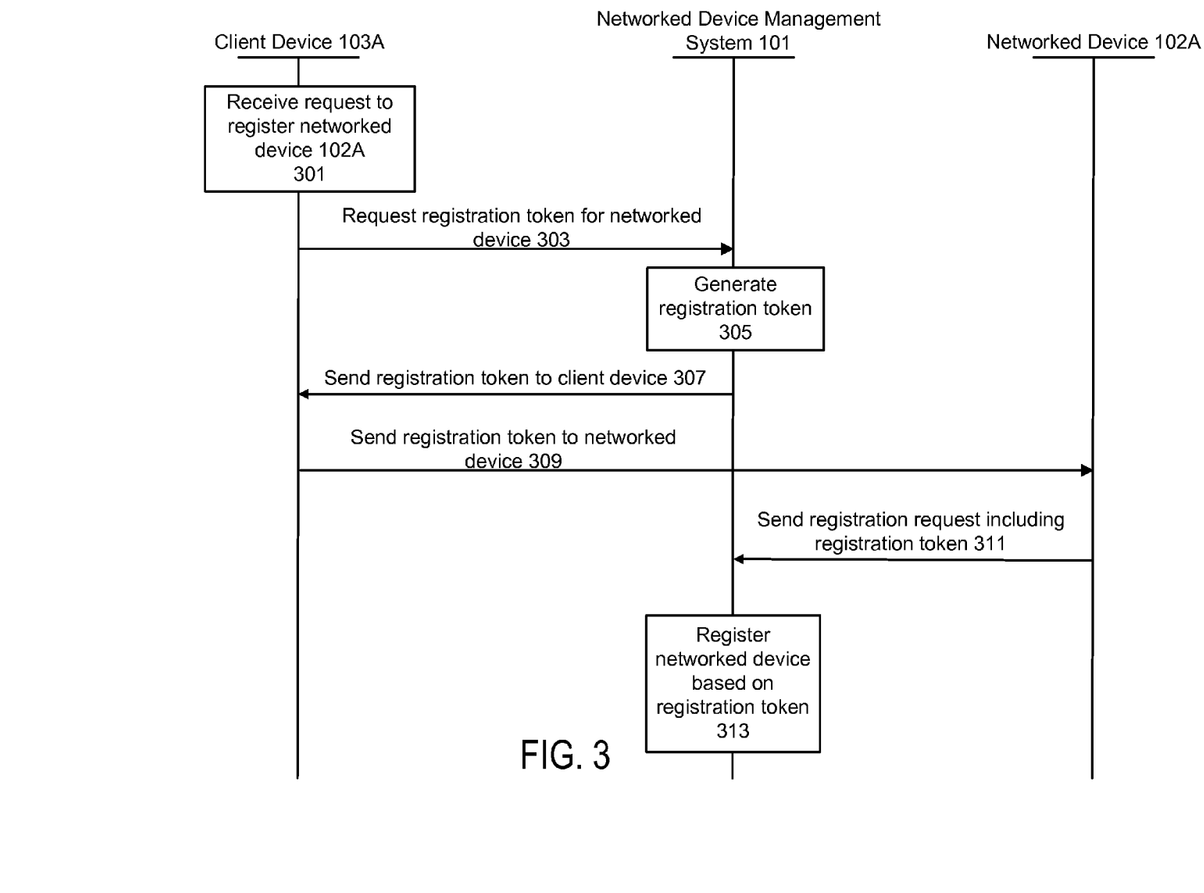
FIG. 3 is an interaction diagram of a process for registering a networked device according to one embodiment.

FIG. 3 is an interaction diagram of a process for registering networked device 102A according to the embodiment shown in FIG. 1. The interaction diagram illustrates the steps performed by client device 103A, NDMS 101, and networked device 102A.

Client device 103A receives 301 a user request on client application 115 to register networked device 102A with NDMS 101. In response, client device 103A requests 303 a registration token for networked device 102A from NDMS 101. NDMS 101 generates 305 a registration token responsive to receiving the request. As described above, the registration token is a one-time credential to connect to NDMS 101.

NDMS 101 sends 307 the registration token to client device 103A. Client device 103A sends 309 the registration token to networked device 102A. Networked device 102A sends 311 a registration request including the registration token to NDMS 101. The registration request may also include metadata associated with networked device 102A describing device capabilities of networked device 102A. NDMS 101 registers 313 networked devices 102A based on the registration token.

Figure 4:
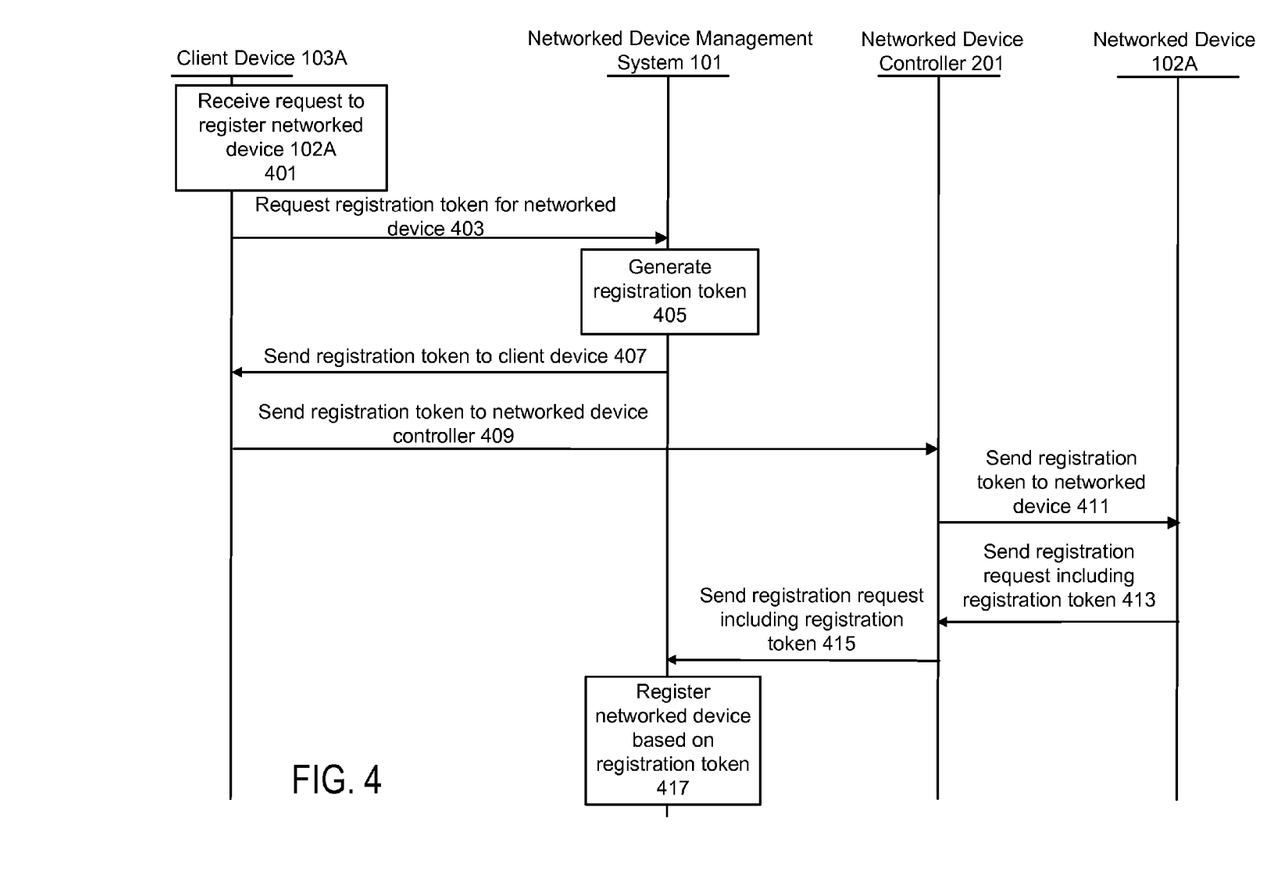
FIG. 4 is an interaction diagram of a process for registering a networked device according to another embodiment.

FIG. 4 is an interaction diagram of a process for registering networked device 102A according to the embodiment shown in FIG. 2. The interaction diagram illustrates the steps performed by client device 103A, NDMS 101, networked device controller 201, and networked device 102A.

Client device 103A receives 401 a user request on client application 115 to register networked device 102A with NDMS 101. In response, client device 103A requests 403 a registration token for networked device 102A from NDMS 101. NDMS 101 generates 405 a registration token responsive to receiving the request. NDMS 101 sends 407 the registration token to client device 103A. Client device 103A sends 409 the registration token to networked device controller 407 via the API of the networked device management system 101. Networked device controller 101 sends 411 the registration token received from NDMS 101 to networked device 102A. Networked device controller 201 may communicate with networked device 102A via a communication protocol different than the communication protocol used by networked device controller 201 to communicate with NDMS 101.

Networked device 102A sends 413 a registration request including the registration token to networked device controller 201. The registration request may also include metadata associated with networked device 102A that describes device capabilities of networked device 102A. Networked device controller 201 sends 415 the registration request including the registration token to NDMS 101. NDMS 101 registers 417 networked device 102A based on the registration token.

State Change of Networked Devices

Figure 5:
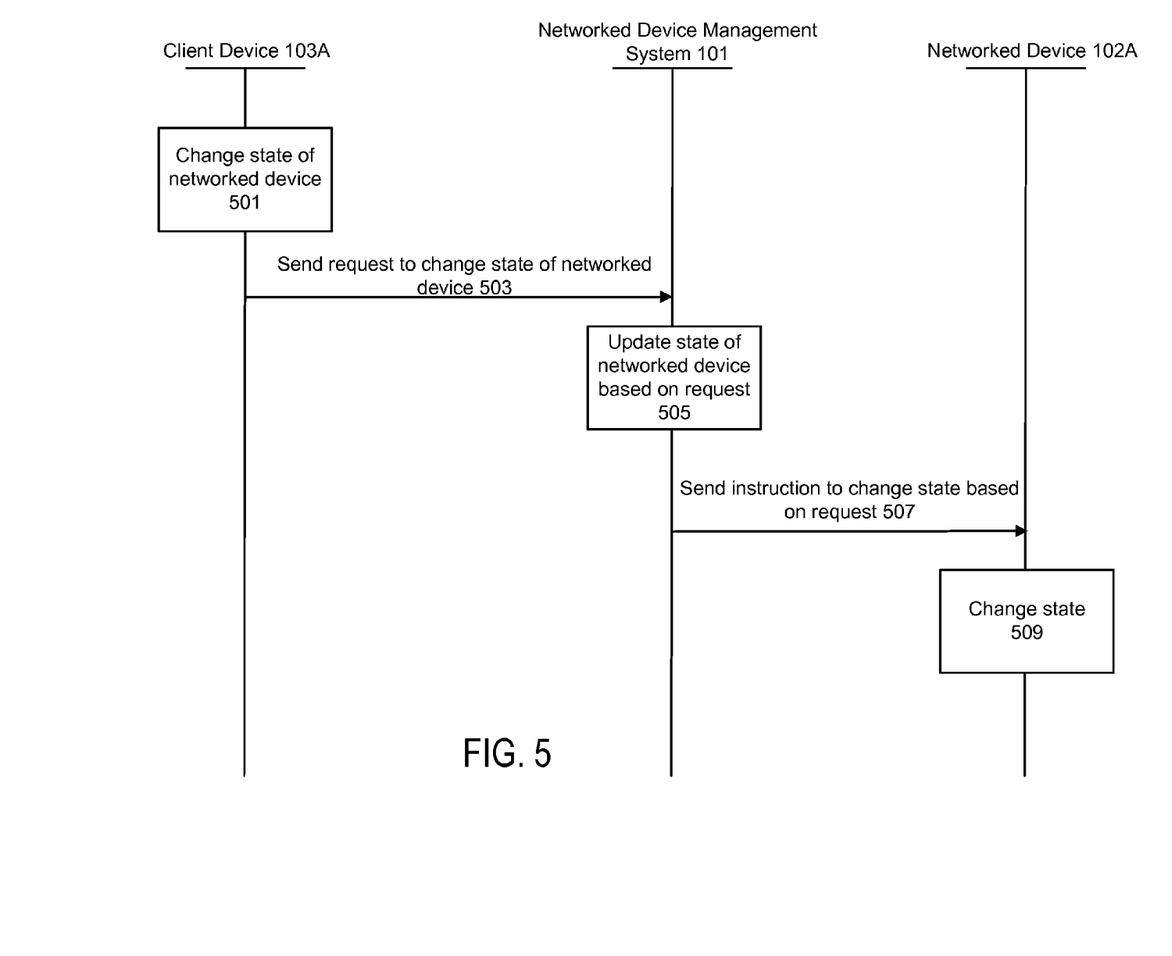
FIG. 5 is an interaction diagram of a process for changing a state of a networked device according to one embodiment.

FIG. 5 is an interaction diagram of a process for changing the state of networked device 102A according to the embodiment shown in FIG. 1. The interaction diagram illustrates the steps performed by client device 103, NDMS 101, and networked device 102A.

Client device 103A receives a request 501 to change the state of networked device 102A via client application 115 on client device 103. The request may include one or more values of functional capabilities of networked device 102A requesting to be changed. For example, the first user may request to change the refrigerator temperature of networked device 102A. Client device 103A sends 503 a request to change the state of networked device 102A to NDMS 101. NDMS 101 updates 505 the state of networked device 102A based on the request. NDMS 101 may update the state of networked device 102 by updating state field values of the functional capabilities indicated in the request. Networked device management system sends 507 an instruction to networked device 102A to change its state based on the request. Networked device 102A changes 509 its state based on the instruction. For example, networked device 102A may change its refrigerator temperature from 33° F. to 30° F. based on the instruction.

Figure 6:
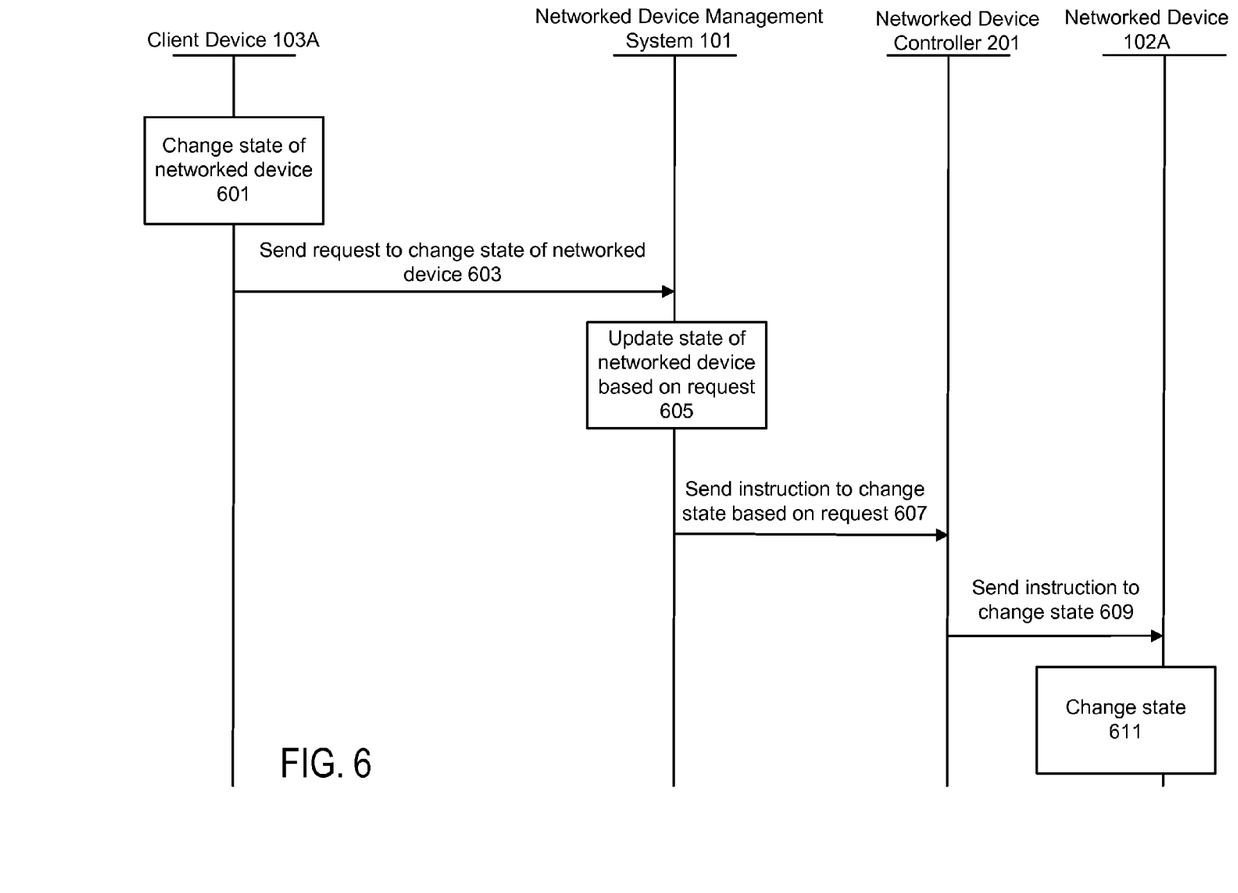
FIG. 6 is an interaction diagram of a process for changing a state of a networked device according to another embodiment.

FIG. 6 is an interaction diagram of a process for changing the state of networked device 102A according to the embodiment shown in FIG. 2. The interaction diagram illustrates the steps performed by client device 103A, NDMS 101, networked device controller 201, and networked device 102A.

Client device 103A receives a request 601 to change the state of networked device 102A via client application 115 on client device 103. The request may include one or more values of functional capabilities of networked device 102A requesting to be changed. Client device 103A sends 603 a request to change the state of networked device 503 to NDMS 101. NDMS 101 updates 505 the state of networked device 102A based on the request.

Networked device management system sends 607 an instruction to networked device controller 201 to change the state of networked device 102A based on the request. NDMS 101 may communicate with networked device controller 201 via the API of NDMS 101. Networked device controller 201 sends 609 the instruction to the networked device 102A to change its state based on the request. Networked device controller 201 may communicate with networked device 102A via a communication protocol different than the communication protocol used by networked device controller 201 to communicate with NDMS 101. Networked device 102A changes 611 its state based on the instruction. For example, networked device 102A may change its refrigerator temperature from 33° F. to 30° F. based on the instruction.

Figure 7:
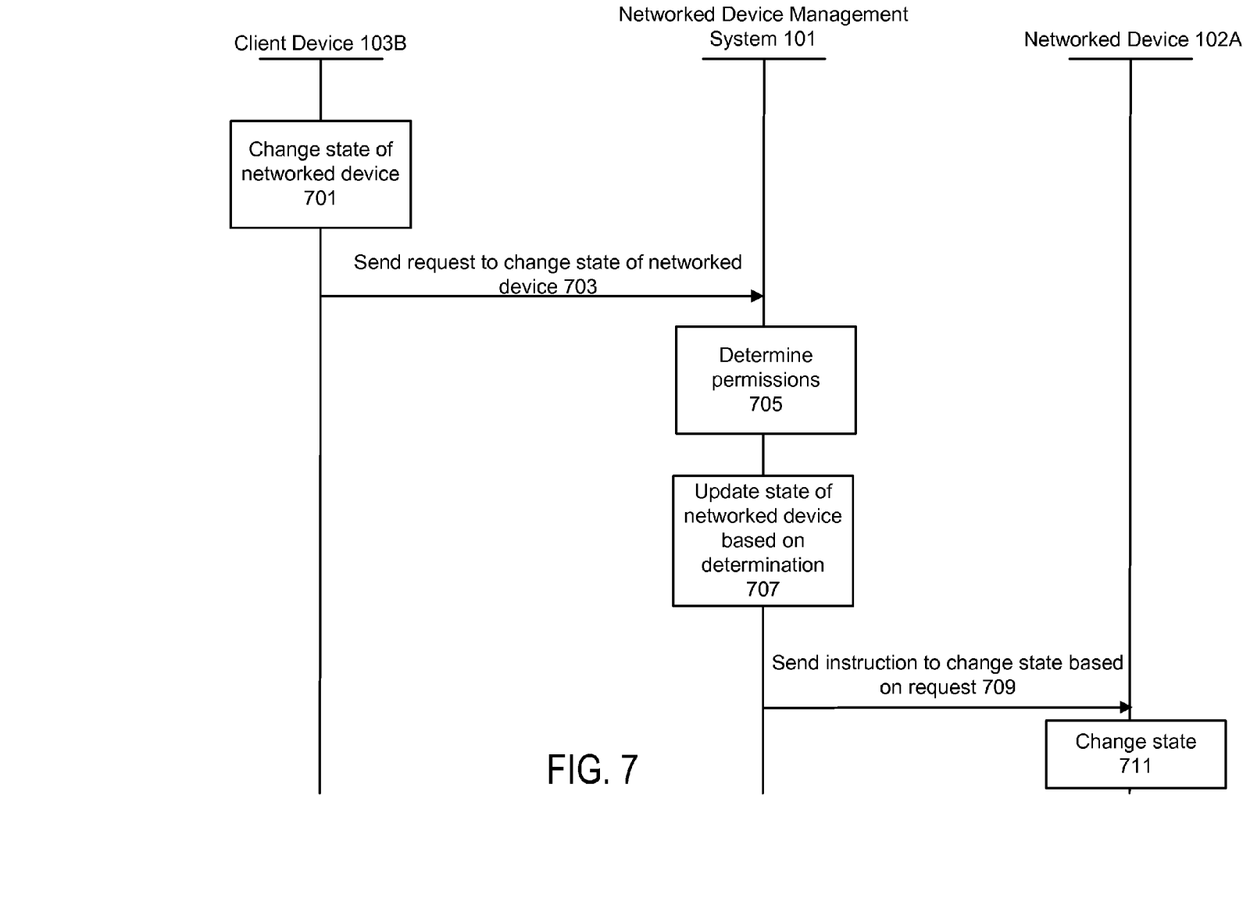
FIG. 7 is an interaction diagram of a process for changing a state of a networked device of another user according to one embodiment.

FIG. 7 is an interaction diagram of a process for changing the state of networked device 102A according to the embodiment shown in FIG. 1. In contrast to FIG. 5, client device 103B is associated with the second user and is requesting to control networked device 102A owned by the first user. The interaction diagram illustrates the steps performed by client device 103B, NDMS 101, and networked device 102A.

Client device 103B receives a request 701 to change the state of networked device 102A via client application 115B on client device 103B. As mentioned above, client device 103B is associated with the second user, but networked device 102A is owned by the first user associated with client device 103A. The request may include one or more values of functional capabilities of networked device 102A requesting to be changed. Client device 103B sends 703 a request to change the state of networked device 102A to NDMS 101.

NDMS 101 determines 705 permissions afforded to client device 103B of the second user to control networked device 102A of the first user. The owner of networked device 102A (i.e., the first user) may establish permissions based on the particular user attempting to control networked device 102A, geographic location of client device 103B, and/or device type of client device 103B. If the NDMS 101 determines that client device 107 is granted permission to change the state of networked device 102A, NDMS 101 updates 705 the state of networked device 102A based on the determination. Otherwise, NDMS 101 denies the request.

Networked device management system sends 709 an instruction to networked device 102A to change its state based on the request. Networked device 102A changes 711 its state based on the instruction. For example, networked device 102A may change its refrigerator temperature from 33° F. to 30° F. based on the instruction.

Figure 8:
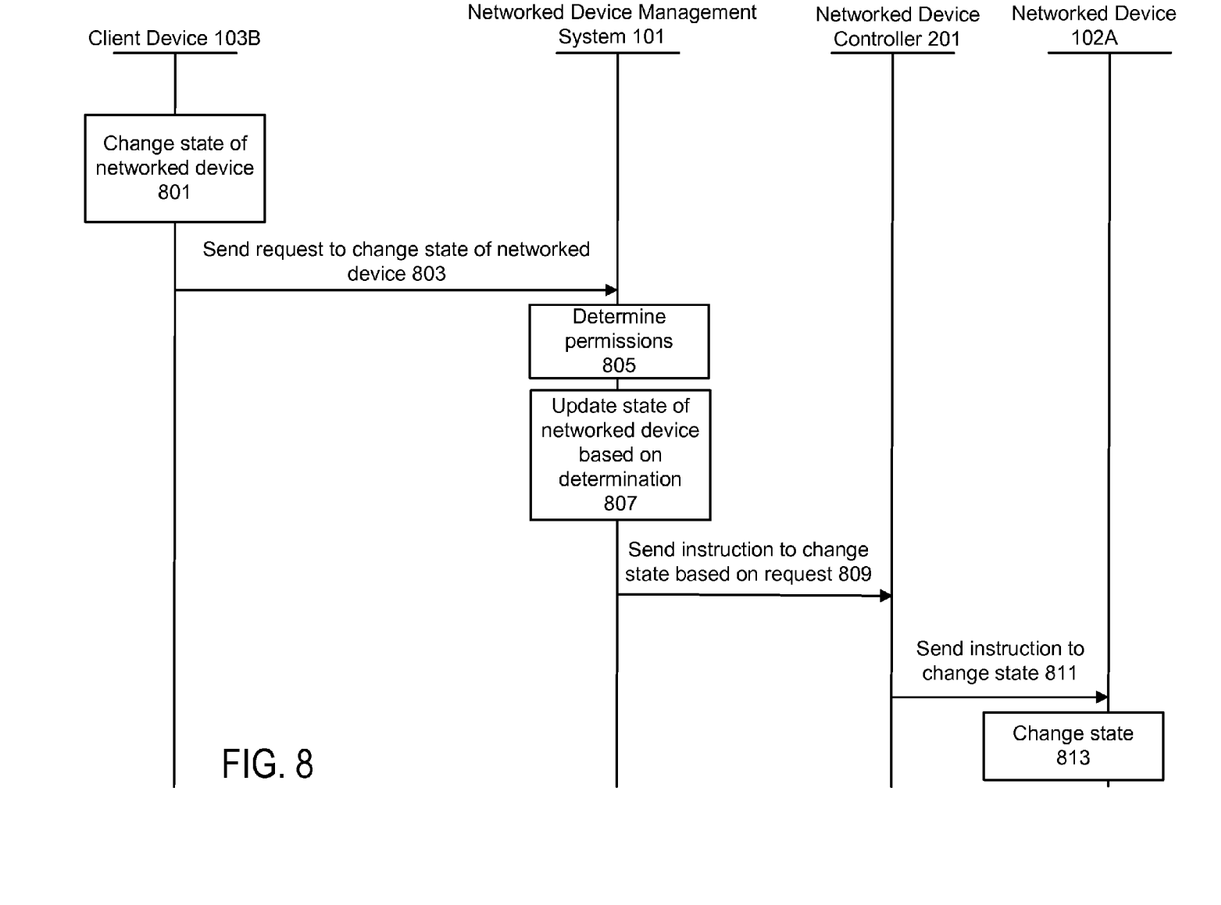
FIG. 8 is an interaction diagram of a process for changing a state of a networked device of another user according to another embodiment.

FIG. 8 is an interaction diagram of a process for changing the state of networked device 102A according to the embodiment shown in FIG. 2. The interaction diagram illustrates the steps performed by client device 103B, NDMS 101, networked device controller 201 and networked device 102A.

Client device 103B receives a request 801 to change the state of networked device 102A via client application 115B on client device 103B. Note that client device 103B is associated with the second user, but networked device 102A is owned by the first user associated with client device 103A. The request may include one or more values of functional capabilities of networked device 102A requesting to be changed. Client device 103B sends 803 a request to change the state of networked device 102A to NDMS 101.

NDMS 101 determines 805 permissions afforded to client device 103B of the second user to control networked device 102A of the first user as previously described above. If the NDMS 101 determines that client device 103B is granted permission to change the state of networked device 102A, NDMS 101 updates 807 the state of networked device 102A based on the determination. Otherwise, NDMS 101 denies the request.

Networked device management system sends 809 an instruction to networked device controller 201 networked device 102A to change its state based on the request. NDMS 101 may communicate with networked device controller 201 via the API of NDMS 101. Networked device controller 201 sends 811 the instruction to the networked device 102A to change its state based on the request. Networked device controller 201 may communicate with networked device 102A via a communication protocol different than the communication protocol used by networked device controller 201 to communicate with NDMS 101. Networked device 102A changes 813 its state based on the instruction. For example, networked device 102A may change its refrigerator temperature from 33° F. to 30° F. based on the instruction.

Note that in embodiments described above with respect to FIGS. 1 through 8, elements in addition to those shown in FIGS. 1 through 8 may be included without loss of generality.

ADDITIONAL CONSIDERATIONS

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computer system, a registration request from a first networked device connected to a first network, the registration request including metadata describing functional capabilities of the first networked device;
    registering the first networked device using the metadata included in the registration request;
    receiving, by the computer system, a first request to alter a state of the first networked device located at a first geographic location, the first request received from a computing device of a user;

sending, by the computer system, a first instruction to the first networked device to update its state based on the first request;

receiving, by the computer system, a second request to alter a state of a second networked device connected to a second network and located at a second geographical location different from the first geographical location, the second request received from the computing device of the user;

sending, by the computer system, a second instruction to the second networked device to update its state based on the second request;

receiving, from the computing device of the user, a permission setting granting a second user a level of control of the first networked device;

receiving, from a computing device of the second user, a request to alter the state of the first networked device; and sending an instruction to the first networked device to update its state based on the request from the second user.

2. The computer-implemented method of claim 1, wherein the first networked device and the second networked device includes one of a light switch, a home appliance, a television, a home thermostat, a sprinkler system, an automobile, a desktop computer, a laptop, or a tablet computer.

3. The computer-implemented method of claim 1, further comprising:

receiving a request for a registration token for the first networked device from the computing device of the user;

generating the registration token responsive to the request;

sending the registration token to the computing device, wherein the registration token is forwarded by the computing device to the first networked device.

4. The computer-implemented method of claim 3, wherein the registration request includes the registration token and registering the first networked device comprises:

receiving the registration token from the first networked device;

determining a validity of the registration token received from the first networked device; and storing the functional capabilities of the first networked device described by the metadata and a current state of each of the functional capabilities of the first networked device to register the first networked device in the computer system.

5. The computer-implemented method of claim 4, wherein determining the validity of the registration token comprises:

comparing the registration token with a plurality of valid registration tokens; and determining that the registration token is valid responsive to the registration token matching one of the plurality of valid registration tokens.

6. The computer-implemented method of claim 1, wherein the first request to alter the state of the first networked device comprises an indication of a setting of a functional capability of the first networked device desired by the user.

7. The computer-implemented method of claim 1, wherein the level of control granted to the second user includes control of all functional capabilities of the first networked device or includes control of a subset of the functional capabilities of the networked device.

8. The computer-implemented method of claim 1, further comprising:

receiving, from the computing device of the user, a permission setting granting a level of control of the first networked device based on a type of computing device requesting to update the state of the first networked device, the type of computing device indicative of a security level of the computing device;

wherein the level of control includes control of all functional capabilities of the first networked device or includes control of a subset of the functional capabilities of the first networked device.

9. The computer-implemented method of claim 8, wherein sending the first instruction to the first networked device comprises:

determining a type of the computing device that sent the first request; and sending the first instruction responsive to determining that the computing device is granted a level of control of the first networked device to alter the state of the first networked device according to the first request based on the determined type.

10. The computer-implemented method of claim 1, further comprising:

receiving, from the computing device of the user, a permission setting granting a level of control of the first networked device based on a geographic location of a computing device requesting to update the state of the first networked device, the geographic location of the computing device indicative of a security level of the computing device;

wherein the level of control includes control of all functional capabilities of the first networked device or includes control of a subset of the functional capabilities of the first networked device.

11. The computer-implemented method of claim 10, wherein sending the first instruction to the first networked device comprises:

determining a geographic location of the computing device that sent the first request; and sending the first instruction responsive to determining that the computing device is granted a level of control of the first networked device to alter the state of the first networked device according to the first request based on the geographical location of the computing device.

12. The computer-implemented method of claim 1, further comprising:

publishing, by the computer system, settings information of a plurality of networked devices registered with the computer system;

receiving a request from the computing device of the user to replicate published setting information of one of the plurality of networked devices to the first networked device of the user; and sending an instruction to the first networked device to update its settings based on the published setting information of the one of the plurality of networked devices.

13. A computer program product comprising a non-transitory computer-readable storage medium storing executable code, the code when executed causing a computer to perform steps comprising:

receiving, by a computer system, a registration request from a networked device controller to register a networked device, the registration request received via a first communication protocol and the registration request including metadata describing capabilities of the networked device;

registering the networked device using the metadata included in the registration request;

receiving, by the computer system, a request to alter a state of the networked device from a computing device of a user;

sending, by the computer system, an instruction to the networked device controller to update the state of the networked device based on the request, wherein the networked device controller communicates with the networked device to update the state of the networked device via a second communication protocol distinct from the first communication protocol;

receiving, from the computing device of the user, a permission setting granting a second user a level of control of the networked device;

receiving, from a computing device of the second user, a request to alter the state of the networked device; and sending, by the computer system, an instruction to the networked device controller to update the state of the networked device based on the request from the second user, wherein the networked device controller sends an instruction to the networked device to update its state based on the instruction received from the computer system.

14. The computer program product of claim 13, wherein the networked device controller is located in proximity to the networked device.

15. The computer program product of claim 13, wherein the networked device includes one of a light switch, a home appliance, a television, a home thermostat, a sprinkler system, an automobile, a desktop computer, a laptop, or a tablet computer.

16. The computer program product of claim 13, further comprising:

receiving, from the computing device of the user, a permission setting granting a level of control of the networked device based on a type of computing device requesting to update the state of the networked device, the type of computing device indicative of a security level of the computing device, wherein the level of control includes control of all functional capabilities of the first networked device or includes control of a subset of the functional capabilities of the first networked device;

determining a type of the computing device that sent the first request; and sending the first instruction responsive to determining that the computing device is granted a level of control of the first networked device to alter the state of the networked device according to the first request based on the determined type.

17. A networked device controller comprising:

at least one computer processor; and a non-transitory computer-readable storage medium storing executable code, the code when executed by the computer processor causing the networked device controller to perform steps comprising:

sending, by the networked device controller located in proximity to a networked device, a registration request to a computer system to register the networked device, the registration request sent via a first communication protocol and the registration request including metadata describing capabilities of the networked device, wherein the computer system registers the networked device using the metadata;

receiving, by the networked device controller, an instruction from the computer system to update a state of the networked device controller responsive to the computer system receiving a request to alter the state of the networked device from a computing device of a user;

sending an instruction to the networked device to update the state of the networked device based on the instruction received from the computer system, the networked device controller communicating with the networked device via a second communication protocol distinct from the first communication protocol;

receiving, from the computer system, an instruction to update the state of the networked device based on a request from a second user, wherein the computer system received a permission setting granting the second user a level of control of the networked device; and sending an instruction to the networked device to update its state based on the instruction received from the computer system.

* * * * *